Figure 1:
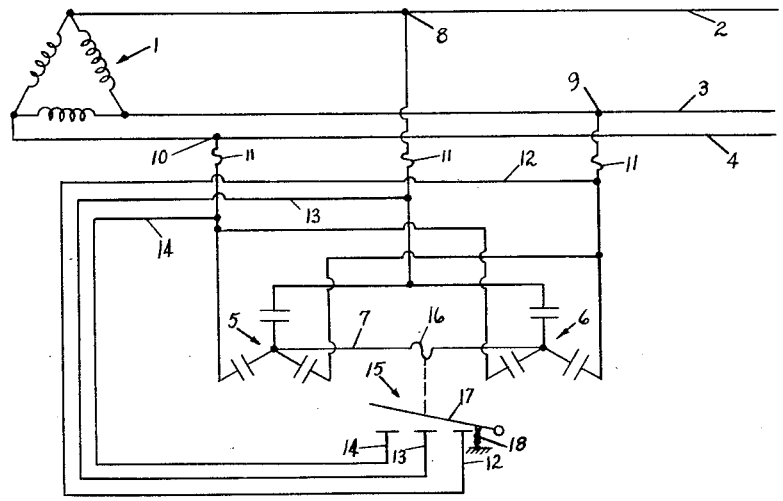

Oct. 22, 1957        P. M. MINDER        2,810,865

PROTECTION OF WYE-CONNECTED CAPACITORS IN A DELTA SYSTEM

Filed Aug. 24, 1953

INVENTOR.
Peter M. Minder
BY
Charles A. Lindell
Attorney

United States Patent Office

2,810,865
Patented Oct. 22, 1957

2,810,865

PROTECTION OF Y-CONNECTED CAPACITORS IN A DELTA SYSTEM

Peter M. Minder, Milwaukee, Wis., assignor to McGraw-Edison Company, a corporation of Delaware Application August 24, 1953, Serial No. 375,944

5 Claims. (Cl. 317—12)

This invention relates to a protective system for electrical apparatus and in particular to a system for detecting a fault in any capacitor of a bank of capacitors connected in Y to a delta system for the purpose of creating a three phase short circuit with consequent fuse rupture and disconnection of the capacitor bank from the system.

On electrical transmission and distribution systems, capacitors are used to correct the power factor and to improve the voltage level. In copending patent application Serial No. 357,996, filed May 28, 1953, by Blaine H. Schultz and Peter M. Minder and having the same assignee as this application, ungrounded Y-connected banks of capacitors are used in a polyphase four wire electrical system. In said patent application, the neutral between two groups of Y-connected capacitors is split and a current detecting device installed which actuates a switch for grounding the neutral in the event of a fault in any of the capacitors. The grounding of said neutral ruptures the fuse in the phase where the fault occurs to disconnect that phase from the system and prevent damage to the remaining capacitors.

Another patent application Serial No. 368,284, filed July 16, 1953, of Peter M. Minder and Blaine H. Schultz, having the same assignee as this application, discloses a current detecting system in a bank of Y-connected capacitors with an ungrounded neutral. The current detecting system includes current transformers, one per phase, each having its primary connected in series with one capacitor of said phase. The secondaries of said transformers are connected in parallel and in a series circuit with a current responsive device which is adapted to actuate a switch to ground the neutral of the capacitor bank upon failure of any capacitor in the bank. This is also used on a four wire system and removes the faulted phase of capacitors by fuse rupture, as in the first mentioned application.

I now propose to apply similar capacitor fault detecting means to a delta system. Capacitors which are delta connected in a delta system have to be designed for the phase to phase voltage class. In order to save insulation material, it is often attempted to use a Y-connection of a capacitor bank in a delta system. If the capacitor rack is insulated from ground, capacitors for phase to neutral voltage can be used which permits the insulation of all capacitors to be lowered one class and results in a considerable saving in equipment cost. But in a delta system there is no ground wire, and so the Y-connected capacitors cannot be grounded to short circuit a phase in the event of a fault in any of the capacitors. If one capacitor in a floating Y-connected bank fails, no phase or Y current increases sufficiently to rupture the phase fuse.

It is an object of the invention to provide means responsive to the failure of any capacitor of a group fuse protected bank of capacitors connected in Y to a delta system to effect a three phase fault and rupture at least two fuses of the capacitor bank, thus removing the capacitors from the system.

Another object of the invention is to provide means of using protected capacitors of a lower voltage rating than has hitherto been possible in a delta system.

And another object of this invention is to provide a means of lessening the insulation requirement of capacitors installed in a delta system.

Other objects will occur from time to time in the course of the specification and claims.

Figure 2:
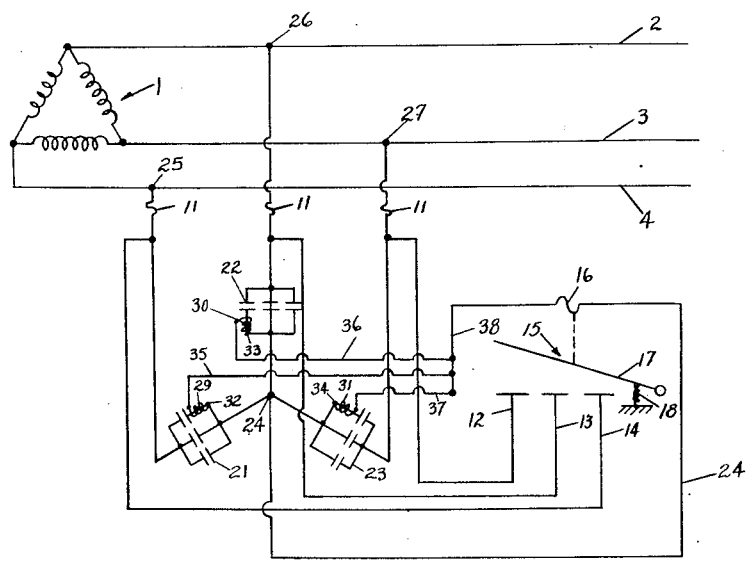
Figure 3:
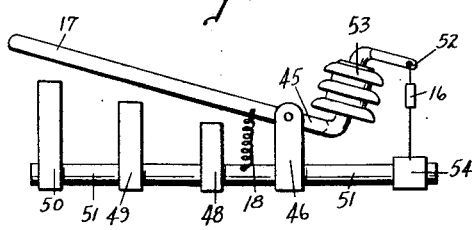

I illustrate my invention diagrammatically in the accompanying drawing in which:

Fig. 1 is a circuit diagram of a delta system having a bank of capacitors connected in Y thereto with the bank split into two parallel groups having their neutrals connected through current responsive means adapted to short circuit the three phases upon failure of any capacitor in the bank, Fig. 2 is a circuit diagram of a delta system having a bank of capacitors connected in Y thereto with current transformers in the neutral connection of one capacitor of each phase of the bank to detect capacitor failure and to actuate a switch that will short circuit the three phases, rupture the fuses and disconnect the bank, and Fig. 3 illustrates a switch which is adapted for use in the systems of Figs. 1 and 2 to effect short circuiting of the three phases.

Like reference numerals indicate like parts throughout.

In Fig. 1 the delta source is represented by the numeral 1 and the three lines from it by the numerals 2, 3, and 4. A bank of capacitors connected in Y to the delta system is split into two parallel groups of capacitors indicated at 5 and 6 with a neutral line 7 connecting the neutrals of the two groups. The three phases of the Y-connected bank of capacitors are connected to the delta system at 8, 9, and 10. A fuse 11 is located in each phase. Connected respectively to each fuse protected phase are the lines 12, 13, and 14 which provide the conductive paths between the three phases and a switching device 15.

The switching device 15 is actuated by a current or voltage sensitive device 16 installed in the neutral line 7 between the two groups of Y-connected capacitors 5 and 6. The current or voltage sensitive device 16 can take the form of a fuse link, spark gap, or solenoid. Fig. 3 illustrates a switch in which a fuse link is utilized as the current sensitive device and will be described in detail hereinafter. Reference is made to the aforementioned application Serial No. 357,996 for details of construction of switches in which a solenoid or a spark gap is utilized as the device 16. A switch blade 17 resiliently urged by a spring 18 to a closed position wherein it electrically connects the lines 12, 13, and 14 is normally held in open position by the device 16. If a fault occurs in any one of the capacitors, unbalance between the two groups 5 and 6 causes current to flow in the neutral line 7. The current sensitive device 16 responds to this unbalance current to release the switch blade 17 into contact with the lines 12, 13, and 14. The switch arm 17 short circuits the three phases beyond the fuses and, consequently, effects rupture of the fuses 11. Thus, the Y-connected capacitor banks are removed from the system.

It is readily apparent that the disclosed protective system is also applicable to two individually fused banks of capacitors Y-connected to a delta system and having their neutrals ungrounded and connected to each other.

The current detecting means shown in Fig. 2 is applied to a bank of capacitors having three phases 21, 22, and 23 Y-connected at the neutral 24. The three phases 21, 22, and 23 are connected to the delta system at 25, 26, and 27 with a fuse 11 in each phase.

Current transformers 29, 30, and 31 in the phases 21, 22, and 23 respectively are utilized to detect a failure in any capacitor in the bank in the manner disclosed in the aforementioned application Serial No. 368,284 to which reference is made for details of operation. The primary of each transformer 29, 30, and 31 is connected in series with one capacitor of the associated phase. The current induced in the secondary of each transformer 29, 30, and 31 is a measure of the current through the associated capacitor. Thus, the neutral wire connection to a capacitor unit forms the primary of the current transformers 29, 30, and 31 in the system illustrated in Fig. 2, and each current transformer can be a small toroid of steel surrounding the neutral wire lead with a few turns of wire encircling the toroid as the secondary winding. Of course, the current transformer can be constructed, if desired, with a plurality of wire turns forming the primary winding. The secondary windings of the current transformers are connected in parallel with one terminal of the secondary winding of the transformers 29, 30, and 31 connected to the neutral 24 at 32, 33, and 34, respectively. The other terminals 35, 36, and 37 of the secondary windings are connected to each other at the conductor 38.

The neutral 24 of the Y-connected capacitor bank and the conductor 38 are connected to each other by means of a fuse link 16, thus completing a circuit through the paralleled secondary windings of the transformers 29, 30, and 31. The parallel secondary windings in a series circuit with the fuse link 16 provide means for detecting unbalance in the currents flowing in the three phases caused by failure of a capacitor. It may be helpful to the understanding of the operation of the system to consider that in accordance with Kirchoff's first law, the algebraic sum of currents in wires that meet in any point is equal to zero, and thus the currents in the three phases vectorially add to zero. Under balanced conditions equal currents flow in all of the capacitors of the bank, and thus the vectorial sum of the currents in the paralleled secondaries is equal to zero, and no current flows through the fuse link 16. Upon unbalance of currents caused by failure of a capacitor, the currents in the parallel transformer secondaries add vectorially to other than zero, and the resultant current flows through and ruptures the fuse link 16. The fuse 16 controls a switch 17 which is resiliently urged by a spring 18 into contact with short-circuiting return paths 12, 13, and 14 to the three phase lines. Thus if a capacitor in any phase should fail, the resulting current flowing between conductor 38 and neutral 24 will rupture the fuse 16 to release the switch blade 17 into contact with the points 12, 13, and 14 of the three phases, thus short circuiting all three phases beyond the fuses 11 and rupturing the fuses. This removes the Y-connected capacitors from the delta system.

Fig. 3 illustrates an electrical switch having a movable arm 45 pivotally mounted on a post 46 and having a switch blade 17 resiliently urged by a spring 18 to a closed position wherein it engages stationary contact jaws 48, 49, and 50 mounted on an insulating base 51. A terminal 52 at the end of the switch arm 50 remote from the blade 17 is electrically isolated from the blade 17 by an insulator 53 preferably of the porcelain type. A fuse link 16 connected between the terminal 52 and a terminal 54 mounted on the insulating base 51 normally holds the switch blade 17 in open position.

The contact jaws 48, 49, and 50 are connected to the lines 12, 13, and 14 when the switch is utilized in the systems of Figs. 1 and 2, and the electrical connections to the fuse link 16 are as illustrated and described above. It is readily apparent that failure of any capacitor will cause current to flow through and rupture fuse link 16 to release switch blade 17 and electrically connect the jaws 48, 49, and 50. The three phases are thus short circuited beyond the fuses 11, which rupture and remove the Y-connected capacitors from the delta system.

A three phase shorting switch used in combination with a fault detecting method can result in considerable savings. The capacitors of a rack can be of a lower voltage class when Y-connected rather than delta connected because the phase to neutral voltage in a Y-connection requires less insulation than the phase to phase voltage of a delta connection. By providing means responsive to a fault in the capacitor bank to short circuit the three phases, the fuses in two or three of the phase lines are ruptured. Thus, the capacitors are removed from the delta system, preventing further destruction of capacitors in the bank.

While I have shown and described preferred embodiments of my invention, it will be obvious to those skilled in the art that various changes and modifications may be made without departing from my invention in its broader aspect and I, therefore, intend in the appended claims, to cover all such changes and modifications as fall within the true spirit and scope of my invention.

What I claim as new and desire to secure by Letters Patent of the United States is:

1. In a delta electrical system, a bank of capacitors connected in Y thereto, a fuse in each phase of capacitors between said bank and said delta system, said bank being split into two parallel groups of capacitors having the neutrals thereof commoned, a thermal current responsive means in said common neutral for detecting unbalance between said groups resulting from a fault in any of the capacitors of the said bank, and a switching device normally restrained in open position by said thermal current responsive means and adapted to short circuit the three phases of said capacitor bank by releasing said switch when said thermal means becomes conductive, thereby rupturing said fuses in said phases and removing said Y-connected capacitor bank from said delta system.

2. In a delta electrical system, a bank of capacitors connected in Y thereto, a fuse in each phase of capacitors between said bank and said delta system, said bank being split into two parallel groups of Y-connected capacitors having the neutrals thereof commoned, a switching device biased toward closed position and adapted when closed to short circuit the three phases of said capacitor bank, thereby rupturing said fuses in said phases and removing said Y-connected capacitor bank from said delta system, and a fusible element in said common neutral normally holding said switching device open and responsive to potential unbalance between said neutrals resulting from a fault in a capacitor to release said switching device.

3. In a delta electrical system, a bank of capacitors connected in Y thereto with the neutral ungrounded, a fuse in each phase of capacitors between said bank and said delta system, and means including a current transformer in each phase of capacitors for deriving an alternating current for each phase proportional to the current through one capacitor in the respective phase, the secondaries of all said current transformers being connected in parallel, one side of the parallel arrangement of secondaries being connected to said neutral, a rupturable thermal current responsive device connected between the other side of said parallel arrangement and said neutral, and a switch normally restrained in open position by said rupturable thermal current responsive device and adapted to be released for short circuiting the three phases of said Y-connected bank of capacitors, thereby rupturing the fuse in each phase and removing said bank of capacitors from the delta system.

4. In combination with a delta electric system, a bank of capacitors connected in Y to the delta system and having an ungrounded neutral, a protective device in each phase of capacitors between said bank and said delta system, an unbalance detecting device comprising three current transformers, one in each phase, each having its primary in series with one capacitor of the respective phase, the secondary windings of said current transformers each having two terminals, one of said terminals being connected to the neutral of the bank and the second of said terminals being interconnected with the second terminals of the other secondary windings, thereby connecting all secondary windings of the current transformers in parallel, a fusible element connected between the said neutral of the bank and the common point of connection of said second terminals, and a switch adapted when closed to short circuit the three phases of said capacitor bank and being biased toward closed position, said fusible element normally holding said switch open and upon rupture releasing said switch for movement to closed position, thereby short circuiting the three phases of said Y-connected capacitors.

5. In combination with a delta electrical system, a bank of capacitors connected in Y thereto with its neutral point ungrounded, a fuse in each phase between said system and bank, a current transformer whose primary is in series with one capacitor in each phase, respectively, the transformer secondary windings being connected in parallel with each other at the common neutral point of the capacitor bank and at another common point for detecting unbalanced current between phases of the bank, current operable means including a thermally rupturable element in parallel with said secondary windings and across said common neutral point and said other common point, normally open switch means connected between said bank and said fuses and including biasing means urging said switch means closed for short circuiting said fuses, said switch means being normally restrained by said current operable means and released upon occurrence of an unbalanced condition causing rupture of said element to short circuit said fuses and thereby deenergize the bank.

References Cited in the file of this patent

UNITED STATES PATENTS

| | | |
|---|---|---|
| 825,286 | Alexanderson | July 10, 1906 |
| 1,483,552 | Pickard | Feb. 12, 1924 |
| 1,730,858 | Marbury | Oct. 8, 1929 |
| 2,016,911 | Stafford | Oct. 8, 1935 |
| 2,349,611 | Butler | May 23, 1944 |
| 2,371,496 | Bennett | Mar. 13, 1945 |
| 2,550,119 | Marbury | Apr. 24, 1951 |
| 2,572,637 | Linchs | Oct. 23, 1951 |

FOREIGN PATENTS

| | | |
|---|---|---|
| 2,772 | Great Britain | 1888 |
| 38,808 | France | Apr. 27, 1931 |
| 475,130 | Great Britain | Nov. 15, 1937 |
| 718,972 | Great Britain | Nov. 24, 1954 |
| 1,064,170 | France | Dec. 23, 1954 |

OTHER REFERENCES

"Bank of Capacitors Reinforces 132–KV Grid," L. F. Ferri, C. S. Dayton, Electrical World, pp. 66–69, March 29, 1947.